US012760663B2

(12) United States Patent
Rowlands et al.

(10) Patent No.: US 12,760,663 B2
(45) Date of Patent: Oct. 13, 2026

(54) FIXING APPARATUS

(71) Applicant: ROLLS-ROYCE PLC, London (GB)

(72) Inventors: Scott Rowlands, Derby (GB); Tristan J. Horswell

(73) Assignee: ROLLS-ROYCE PLC, London (GB)

( * ) Notice: Subject to any disclaimer, the term of this patent is extended or adjusted under 35 U.S.C. 154(b) by 430 days.

(21) Appl. No.: 17/800,400

(22) PCT Filed: Jan. 14, 2021

(86) PCT No.: PCT/EP2021/050745
§ 371 (c)(1),
(2) Date: Aug. 17, 2022

(87) PCT Pub. No.: WO2021/164958
PCT Pub. Date: Aug. 26, 2021

(65) Prior Publication Data

US 2023/0078542 A1 Mar. 16, 2023

(30) Foreign Application Priority Data

Feb. 21, 2020 (GB) ..................................... 2002429

(51) Int. Cl.
*B32B 37/10* (2006.01)
*B29C 73/30* (2006.01)
(Continued)

(52) U.S. Cl.
CPC ............ *F01D 25/285* (2013.01); *B29C 73/30* (2013.01); *B32B 37/10* (2013.01); *F01D 5/3007* (2013.01);
(Continued)

(58) Field of Classification Search
CPC ...... B29C 73/30; F01D 5/3092; F01D 25/285
See application file for complete search history.

(56) References Cited

U.S. PATENT DOCUMENTS 2,767,460 A * 10/1956 Schultz .................. B23P 15/04 29/889.7
5,935,360 A 8/1999 Griggs
(Continued)

FOREIGN PATENT DOCUMENTS

| | | | |
|---|---|---|---|
| EP | 2270314 | A2 | 1/2011 |
| FR | 3083568 | A1 | 1/2020 |
| WO | 2020008142 | A1 | 1/2020 |

OTHER PUBLICATIONS

Jul. 10, 2020—(GB) Search Report—App. No. 2002429.5—6 pages.
Apr. 22, 2021—(WO) International Search Report and Written Opinion—App. No. PCT/EP2021/050745—15 pages.

*Primary Examiner* — Philip C Tucker
*Assistant Examiner* — John Blades
(74) *Attorney, Agent, or Firm* — Banner & Witcoff, Ltd.

(57) ABSTRACT

There is disclosed a fixing apparatus (10) for fixing a secondary component (14) to a fan blade, the fixing apparatus comprising: a first clamp part (16) comprising a first inner surface (20) and a second clamp part (18) comprising a second inner surface (22), the first inner surface and the second inner surface having a profile corresponding to a profile of a portion of the fan blade (102). The first clamp part and/or the second clamp part comprises a recess (24) in the respective first inner surface and/or second inner surface for receiving the secondary component, and a corresponding heater (28, 30) for applying heat to the secondary component located in the recess in use. The first clamp part and the second clamp part are configured to cooperate with one another to clamp the portion of a blade between them in a clamping operation and to hold the secondary component against the blade when the secondary component is received within the recess.

20 Claims, 3 Drawing Sheets

Figure 1:
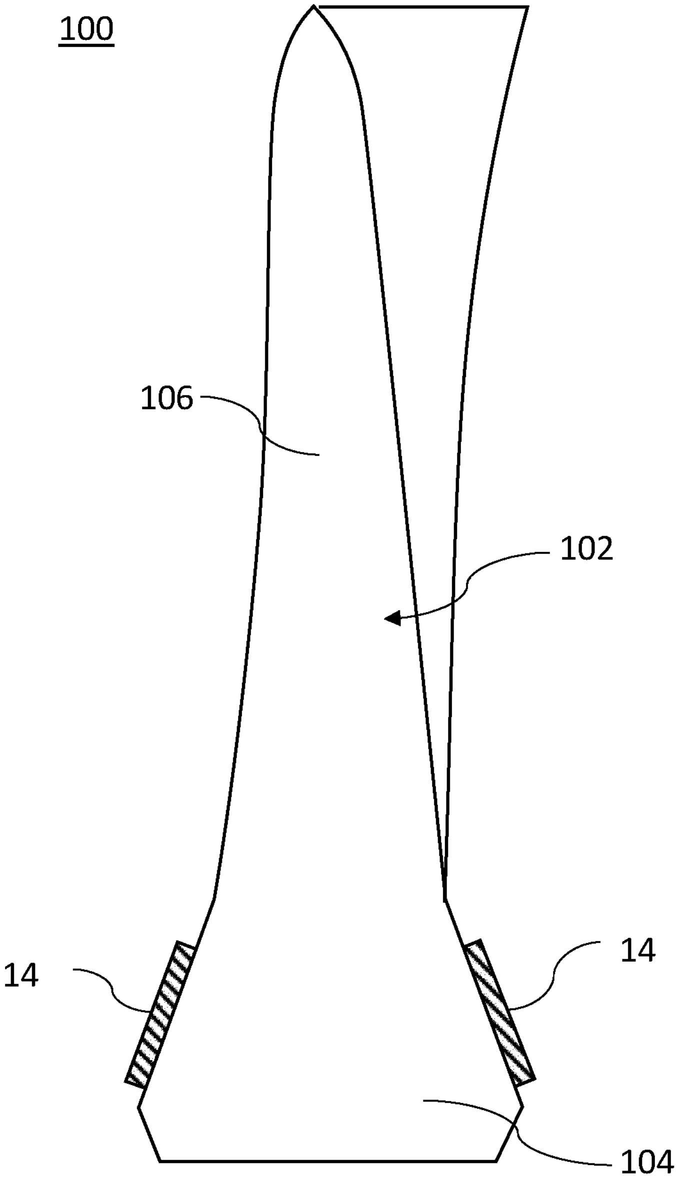

(51) Int. Cl.
*F01D 5/30* (2006.01)
*F01D 25/28* (2006.01)

(52) U.S. Cl.
CPC ........ *F01D 5/3092* (2013.01); *B32B 2309/12* (2013.01)

(56) References Cited

U.S. PATENT DOCUMENTS

| | | | | |
|---|---|---|---|---|
| 6,332,490 | B1 | 12/2001 | Griggs | |
| 2013/0192742 | A1 | 8/2013 | Blackburn et al. | |
| 2016/0076387 | A1 | 3/2016 | Chauvin et al. | |
| 2019/0283271 | A1* | 9/2019 | Tsuru | F01D 5/282 |

* cited by examiner

FIXING APPARATUS

CROSS-REFERENCE TO RELATED APPLICATIONS

The present application is a U.S. National Phase filing of International Application No. PCT/EP2021/050745, filed on Jan. 14, 2021, which claims priority to United Kingdom Application No. 2002429.5, filed Feb. 21, 2020, and the present application claims priority to the benefit of the above-identified applications, both of which are incorporated by reference herein in their entireties.

The present invention relates to a fixing apparatus for fixing a secondary component to a fan blade.

Fan blades for gas turbine engines are typically retained by the root in a holding disc in use, and subject to large centrifugal forces, such that the root of the fan blade is subject to high levels of wear over time. This may be mitigated by bonding a wear resistant material to the surface of the root so as to provide a sacrificial material to protect the fan blade.

According to an aspect, there is provided a fixing apparatus for fixing a secondary component to a fan blade, the fixing apparatus comprising: a first clamp part comprising a first inner surface and a second clamp part comprising a second inner surface, the first inner surface and the second inner surface having a profile corresponding to a profile of a portion of the fan blade; wherein the first clamp part and/or the second clamp part comprises a recess in the respective first inner surface and/or second inner surface for receiving the secondary component, and a corresponding heater for applying heat to the secondary component located in the recess in use; wherein the first clamp part and the second clamp part are configured to cooperate with one another to clamp the portion of a blade between them in a clamping operation and to hold the secondary component against the blade when the secondary component is received within the recess.

The portion of the fan blade may comprise the root of the fan blade. The portion of the fan blade may comprise the whole fan blade. The secondary component may comprise a hard wearing material such that it serves as an anti-wear component on the fan blade. In particular, the secondary component may be disposed on the root of the fan blade to protect the root of the fan blade from damage when it is retained in a holding disc.

The fixing apparatus may comprise a cavity in the first clamp part and/or second clamp part for receiving a temperature sensor for monitoring the temperature of the secondary component in the clamping operation. The cavity may be embedded in the first clamp part and/or the second clamp part.

The fixing apparatus may comprise a temperature sensor disposed in the cavity. The temperature sensor may be a thermocouple. The temperature sensor may be a pyrometer.

In the first clamp part and/or the second clamp part which comprises the cavity, there may be a tube extending from the cavity to the respective inner surface. The tube may be configured to permit removal and replacement of the temperature sensor in the cavity.

The first inner surface and the second inner surface may have profiles corresponding to a profile of a root of the fan blade.

The recess may define an elongate strip shape. The elongate strip shape may extend along an axis. The axis may extend in a direction corresponding to a chordwise extent of the root of the fan blade.

The secondary component may be configured to be a sacrificial component comprising a sacrificial material, such as a Vesper).

One of the first clamp part and the second clamp part may comprise a plurality of locating pins. The other of the second clamp part and the first clamp part may comprise a corresponding plurality of locating holes for receiving the locating pins when the first clamp part and the second clamp part cooperate with one another in the clamping operation.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Figure 2:
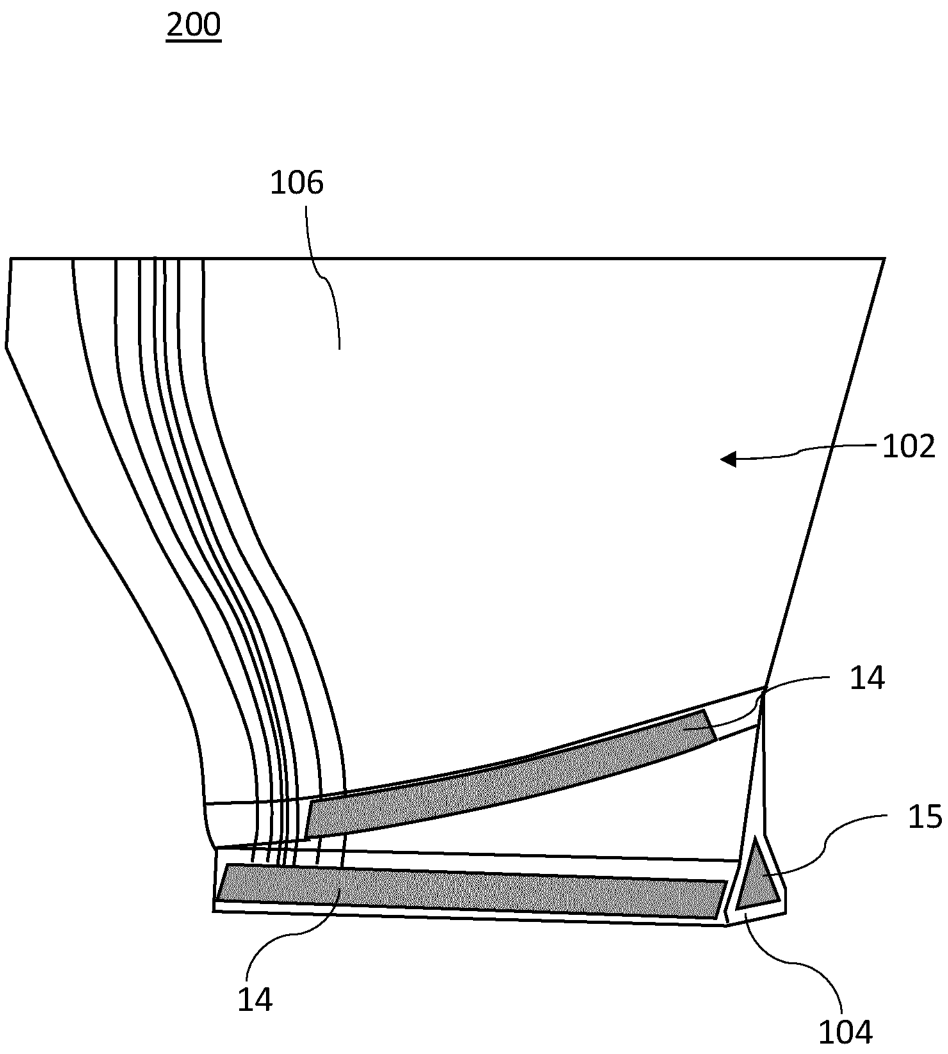
Figure 3:
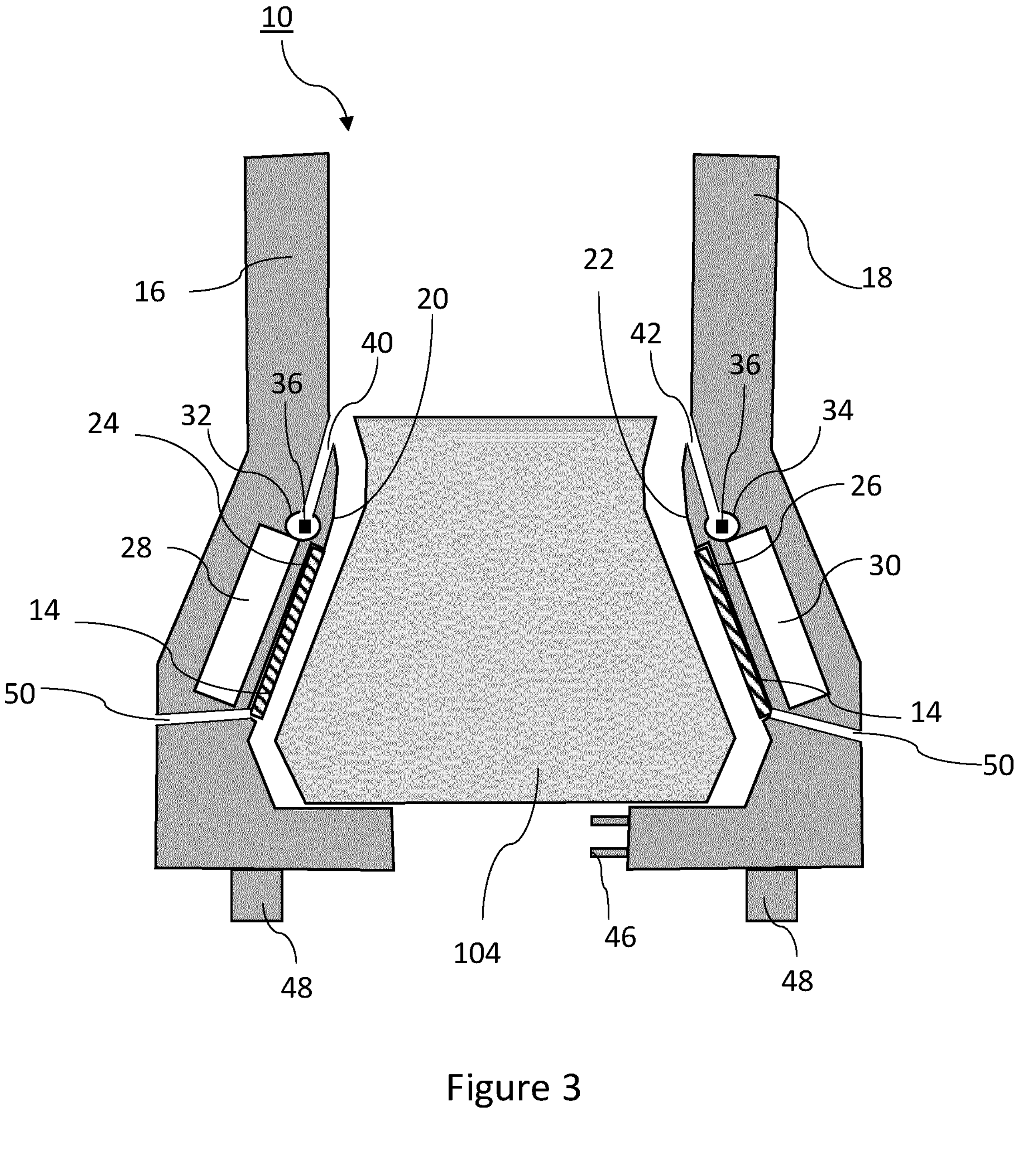

Embodiments will now be described, by way of example only, with reference to the accompanying FIGURE, in which:

FIG. 1 schematically shows a cross sectional view of a first example fan blade arrangement for a gas turbine engine; and FIG. 2 schematically shows a close up side view of a portion of a second example fan blade arrangement; and FIG. 3 schematically shows a cross sectional view of an example fixing apparatus enclosing a portion of a fan blade.

Aspects and embodiments of the present disclosure will now be discussed with reference to the accompanying figures. Further aspects and embodiments will be apparent to those skilled in the art.

FIG. 1 shows a cross-sectional view of a fan blade arrangement 100 for a gas turbine engine. The fan blade arrangement 100 comprises a fan blade 102 comprising a root 104 and an aerofoil portion 106.

The fan blade arrangement 100 further comprises a pair of secondary components 14 disposed on either side of the root 104. The secondary components 14 are fixed to the root 104 and protrude from the root 104. The secondary components 14 are configured to provide an interference fit for the root 104 within a holding disc in use.

The secondary components 14 are shaped in elongate strips to provide protruding strips on the surface of the root 104. The secondary components 14 are elongate along an axis, and the axis of the secondary components may extend along a chordwise axis of the fan blade arrangement 100 (i.e. into the page with reference to FIG. 1). In other examples, the secondary component may be positioned in any suitable location on the fan blade, and the axis may extend in any suitable direction on the fan blade.

The secondary components 14 serve as a sacrificial component on the fan blade arrangement 100, to protect the fan blade 102 from damage when held in a holding disc during use. In this example, the material of the secondary component 14 is a Vesper). In other examples, the material of the secondary component 14 may be any fibre reinforced plastic (FRP). The secondary component material may be a hard-wearing material. The material of the secondary component may have a lower hardness than the material of the fan blade so that the secondary component preferentially wears in use to protect the fan blade.

The fan blade 102 comprises a FRP, in this example carbon fibre reinforced plastic (CFRP). In other examples, the fan blade 102 may comprise any suitable material.

FIG. 2 shows a close up side view of a second example fan blade arrangement 200. The second example fan blade arrangement 200 is similar to the first example fan blade arrangement 100, and differs only in that there are three pairs of secondary components 14 disposed on either side of the fan blade 102. FIG. 2 shows only one side of the fan blade 102, such that only three secondary components 14, 15 are visible.

One pair of secondary components 14 are in the same position on the root 104 as the secondary components 14 in the first example fan blade arrangement 100, described with reference to FIG. 1 (i.e. the axis extends in a chordwise direction along the root 104).

The second pair of secondary components 14 are disposed on either side of the aerofoil portion 106 of the fan blade 102. The axes of these secondary components 14 extends in a direction having a chordwise direction component, and a spanwise direction component and are also configured to protect the fan blade from wear from the holding disc in use.

The third pair of secondary components 15 are disposed on the flanks of the root 104 of the fan blade 102. The third pair of secondary components 15 have a triangular cross-section to match the flank of the root 104.

FIG. 3 shows a cross-sectional view of a fixing apparatus 10 around a portion of a fan blade 102. The fixing apparatus 10 is configured to perform a clamping operation to fix a secondary component 14 to the fan blade 102. The fixing apparatus 10 may be used to newly apply a secondary component 14 to the fan blade 102, or may be used to repair or replace a previously applied secondary component by fixing a new secondary component 14.

In this example, the fixing apparatus is configured to form a fan blade arrangement 100 as described with reference to FIG. 1. In this example, the portion of the fan blade 102 is the root 104. In other examples, the portion of the fan blade may be any part of the fan blade, or the whole fan blade.

The fan blade 102 in this example is cured before the secondary component 14 is applied to the fan blade 102 in the clamping operation.

The fixing apparatus 10 comprises a first clamp part 16 and a second clamp part 18. The first clamp part 16 comprises a first inner surface 20 which has a profile corresponding to a profile of the portion of the fan blade, in this example, the root 104. The second clamp part 18 comprises a second inner surface 22 which has a profile corresponding to a profile of an opposing part of the root 104 to the first clamp part 16. The first clamp part 16 and the second clamp part 18 are configured to cooperate with one another to clamp the root 104 between them. In this example, the first clamp part 16 and the second clamp part 18 are made from CFRP. In other examples, the first clamp part and the second clamp part may comprise any suitable material.

In this example, the first clamp part 16 comprises a first recess 24 in the first inner surface 20 for receiving the secondary component 14. The second clamp part 18 comprises a second recess 26 in the second inner surface 22 for receiving another secondary component 14. The first recess 24 and the second recess 26 are shaped to receive the secondary components 14, such that in this example, the first recess 24 and the second recess 26 are of an elongate strip shape extending along an axis. The axis of the recess extends in a direction corresponding to a chordwise axis of the fan blade 102 (or the root 104). In the clamping operation, secondary components 14 are received in respective the first and second recesses 24, 26.

In this example, the recesses 24, 26 are 0.3 mm deep to accommodate the secondary components 14. The first and second recess 24, 26 have the same net shape as the secondary components 14 such that the secondary components 14 can be snugly received within the first and second recess 24, 26.

In some examples, only the first clamp part may comprise a recess or only the second clamp part may comprise a recess. In other examples, there may be more than one recess in either of the first clamp part or the second clamp part, each for receiving an additional secondary component.

The first clamp part 16 and the second clamp part 18 are configured to hold the secondary components 14 received in the first and second recesses 24, 26 against the root 104 during the clamping operation. A controlled pressure is applied to the first clamp part 16 and the second clamp part 18. In this example, the controlled pressure is applied via pneumatics. The secondary components 14 are provided with a film adhesive on a surface of the secondary component 14 which contacts the root 104. The film adhesive bonds the secondary component 14 to the root 104 on heating. In this example, the film adhesive is epoxy. In other examples, the film adhesive may be any suitable material.

The first clamp part 16 further comprises a first heater 28 corresponding to the first recess 24. The second clamp part 18 comprises a second heater 30 corresponding to the second recess 26.

The first heater 28 and second heater 30 are configured to apply heat by conduction to the secondary component 14 when received in respective first recesses 24 and second recess 26 to cure the film adhesive, and bond the secondary component 14 to the root 104. It will be appreciated that the heaters may alternatively apply heat by convection or radiation to the secondary component.

In this example, the first heater 28 and the second heater 30 are configured to apply heat to heat the secondary component to at least 120 degree Celsius. The first heater and the second heater may be configured to stop heating when the secondary component is at a maximum temperature of approximately 150 degrees Celsius, in order to avoid damaging the fan blade, a metal work bond line between metal components and the fan blade or the secondary component. In examples where there are more recesses for receiving additional secondary components, there may be a corresponding heater for each recess. In some examples, there may be one or more heaters in each clamp part, each of which is configured to heat a plurality of secondary components in a corresponding plurality of recesses.

The first heater 28 is disposed within the first clamp part 16 and the second heater 30 is disposed within the second clamp part 18. In other words, the heaters 28, 30 are embedded in the respective first clamp part 16 and second clamp part 18. In other examples, they may be disposed on an outer surface of the first clamp part and second clamp part.

In some examples, there may be heatsinks disposed around the heaters to ensure that the fan blade is not damaged by over-heating. The heatsinks may comprise a different material with a high thermal conductivity compared to the material of the clamp. For example, the heatsinks may comprise Nickel-coated steel or Invar. Using a material for the adhesive that only needs to be heated to 120 degrees Celsius, for example, to activate, ensures that heatsinks are not necessary.

In this example, the fixing apparatus 10 further comprises a first cavity 32 in the first clamp part 16, and a second cavity 34 in the second clamp part 18. The first cavity 32 and the second cavity 34 are for receiving a temperature sensor 36 for monitoring the temperature of the secondary component 14 in the respective first recess 24 and second recess 26, during the clamping operation. The temperature is monitored to ensure that it is sufficiently high to cure the adhesive, but not so high as to damage the secondary component 14, the root 104 or the adhesive between them.

There may be a controller to control the first heater 28 and the second heater 30. The controller may receive signals from the temperature sensors 36, and may be programmed to ensure that the temperature is maintained within a lower bound and an upper bound, such as with a negative feedback loop in response to the signals received from the temperature sensor 36.

In this example, the first cavity 32 is embedded in the first clamp part 16 close to the first recess 24, and the second cavity 34 is embedded in the second clamp part 18 close to the second recess 26. In some examples, the cavity may be in the form of a recessed cavity in the first inner surface of the first clamp portion or the second clamp portion, as opposed to being embedded.

FIG. 3 shows a temperature sensor 36 disposed in the first cavity 32 and in the second cavity 34. In other examples, there may be a temperature sensor embedded in the first clamp part and/or the second clamp part, such that there is no cavity. In further examples, there may be no temperature sensor or associated cavity.

In some examples, there may be additional auxiliary temperature sensors disposed further away from the recesses. If an auxiliary temperature sensor, which is disposed further away from the first recess or second recess, registers an abnormally high temperature during a clamping operation, this may indicate that there is an unexpected heatsink, such that the clamping operation may be aborted and reset. The registering of a heatsink may be due to misalignment of the first clamp part 16 and the second clamp part 18, or misalignment of the root 104 within the first clamp part 16 and second clamp part 18.

In this example, the temperature sensor is a thermocouple. In other examples, the temperature sensor may be a pyrometer. Using a pyrometer means that the temperature sensor does not have to be embedded in the first clamp portion or the second clamp portion. In an example where the temperature sensor is a pyrometer, the first clamp portion and/or the second clamp portion comprise through holes to allow light to shine through them for operation of the pyrometer.

The first clamp part 16 comprises a first tube 40 extending from the first cavity 32 to the first inner surface 20. The second clamp part 18 comprises a second tube 42 extending from the second cavity 34 to the second inner surface 22. The first tube 40 and the second tube 42 are configured to permit removal and replacement of the temperature sensor in the respective first cavity 32 and second cavity 34.

The second clamp part 18 comprises a plurality of protruding locating pins 46, which are configured to be received in corresponding locating pin seats (i.e. locating holes, such as blind holes) in the first clamp part 16 so that the first clamp part 16 and the second clamp part 18 can be clamped together reliably during the clamping operation. In some examples, there may be a plurality of pins in the first clamp part which are configured to be received in corresponding pin seats in the second clamp part. In other examples, there may be a plurality of pins in both the first clamp part and the second clamp parts, and a plurality of corresponding pin seats in the first clamp part and the second clamp part which are each configured to receive a pin.

In this example, the first clamp part 16 and the second clamp part 18 comprise levelling feet 48. The levelling feet 48 are moveable to permit levelling of the fixing apparatus 10. Ensuring that the fixing apparatus 10 is levelled can allow for more automation of the clamping operation, such as lowering the fan blade 102 into a predetermined position such that it is accurately received between the first clamp part 16 and the second clamp part 18. In other examples, there may be no levelling feet.

Each of the first clamp part 16 and the second clamp part 18 further comprises a ventilation channel 50 extending from the respective recess 24, 26 to the outside of the clamp part 16, 18. Such a ventilation channel 50 permits ventilation of any gasses which may build up during the clamping operation. There may be multiple ventilation channels through the first clamp part and the second clamp part. Alternatively, there may be an internal grid on the first clamp part and/or the second clamp part configured to provide ventilation, or no ventilation at all.

Use of the fixing apparatus 10 in a clamping operation to fix a secondary component 14 to a fan blade 102 ensures that heat and pressure can be applied in a controlled and reliable manner to the secondary component 14. This results in a more even bondline thickness and fewer voids than in previously considered methods.

Further, consumables to hold the secondary component to the fan blade, such as a vacuum bag and tape, are not required. Therefore, the fixing apparatus 10 requires fewer consumables to form a fan blade arrangement 100, and provides a more reliable means of positioning and adhering secondary components 14 to a fan blade 102.

Although it has been described that the first clamp part and the second clamp part have inner surfaces with profiles corresponding to a profile of the root, the profile of the inner surfaces may correspond only to a portion of the root, or a portion of the blade to which the secondary component is to be affixed.

Although it has been described that fan blade arrangements comprise one, two or three pairs of secondary components, in other examples, there may be any suitable number of secondary components disposed on the fan blades.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A fixing apparatus for fixing a secondary component to a fan blade, the fixing apparatus comprising:

a first clamp part comprising a first inner surface and a second clamp part comprising a second inner surface, the first inner surface and the second inner surface having a profile corresponding to a profile of a portion of the fan blade;

wherein the first clamp part and/or the second clamp part comprises a recess in the respective first inner surface and/or second inner surface for receiving the secondary component, a corresponding heater for applying heat to the secondary component located in the recess in use, and a ventilation channel extending from the recess to an outside of the first clamp part and/or the second clamp part;

wherein the first clamp part and the second clamp part are configured to cooperate with one another to clamp the portion of a blade between them in a clamping operation and to hold the secondary component against the blade when the secondary component is received within the recess, and wherein the recess comprises a stepped surface, the stepped surface being stepped back relative to the respective first and/or second inner surface.

2. A fixing apparatus according to claim 1, comprising a cavity in the first clamp part and/or the second clamp part for receiving a temperature sensor for monitoring a temperature of the secondary component in the clamping operation.

3. A fixing apparatus according to claim 2, wherein the cavity is embedded in the first clamp part and/or the second clamp part.

4. A fixing apparatus according to claim 2, comprising the temperature sensor disposed in the cavity.

5. A fixing apparatus according to claim 4, wherein the temperature sensor is a thermocouple.

6. A fixing apparatus according to claim 2, wherein in the first clamp part and/or the second clamp part which comprises the cavity, there is a tube extending from the cavity to the respective first inner surface and/or second inner surface, wherein the tube is configured to permit removal and replacement of the temperature sensor in the cavity.

7. A fixing apparatus according to claim 1, wherein the first inner surface and the second inner surface have profiles corresponding to a profile of a root of the fan blade.

8. A fixing apparatus according to claim 1, wherein the recess defines an elongate strip shape.

9. A fixing apparatus according to claim 8, wherein the first inner surface and the second inner surface have profiles corresponding to a profile of a root of the fan blade, wherein the elongate strip shape extends along an axis, and wherein the axis extends in a direction corresponding to a chordwise extent of the root of the fan blade.

10. A fixing apparatus according to claim 1, wherein the secondary component is configured to be a sacrificial component comprising a sacrificial material.

11. A fixing apparatus according to claim 1, wherein one of the first clamp part and the second clamp part comprises a plurality of locating pins, and the other of the second clamp part and the first clamp part comprises a corresponding plurality of locating holes for receiving the locating pins when the first clamp part and the second clamp part cooperate with one another in the clamping operation.

12. A fixing apparatus according to claim 1, wherein the first inner surface and the second inner surface define a volume for receiving the portion of the fan blade, and wherein the recess defines a further volume extending away from the volume for receiving the portion of the fan blade, the further volume being shaped to receive the secondary component.

13. A fixing component according to claim 1, wherein the recess is surrounded by the profile.

14. A fixing component according to claim 1, further comprising a recess wall between the stepped surface and the first and/or second inner surface.

15. A fixing component according to claim 1, further comprising a heatsink disposed around the heater.

16. A fixing component according to claim 1, wherein the first inner surface has a first concave shape arranged to receive a blade root of the fan blade and wherein the second inner surface has a second concave shape arranged to receive the blade root of the fan blade.

17. A fixing component according to claim 1, wherein an edge of the recess is configured to abut a blade root of the fan blade when holding the secondary component against the blade.

18. A fixing component according to claim 1, wherein each of the first clamp part and the second clamp part comprises the recess in the respective first inner surface and second inner surface for receiving the secondary component, the corresponding heater for applying heat to the secondary component located in the recess in use, and the ventilation channel extending from the recess to the outside of the first clamp part and the second clamp part.

19. A fixing apparatus comprising:

a first clamp part comprising a first inner surface and a second clamp part comprising a second inner surface, the first inner surface having a first profile corresponding to a profile of a first portion of a fan blade, and the second inner surface having a second profile corresponding to a profile of a second portion of the fan blade;

wherein the first clamp part comprises a first recess in the first inner surface that is recessed within the first profile, for receiving a first secondary component to be fixed to the first portion of the fan blade, a first corresponding heater for applying heat to the first secondary component located in the first recess in use, and a first ventilation channel extending from the first recess to an outside of the first clamp part;

wherein the first clamp part and the second clamp part are configured to cooperate with one another to clamp the first portion and the second portion of the fan blade between them in a clamping operation and to hold the first secondary component against the fan blade when the first secondary component is received within the first recess.

20. A fixing apparatus according to claim 19, wherein the second clamp part comprises a second recess in the second inner surface that is recessed within the second profile, for receiving a second secondary component to be fixed to the second portion of the fan blade, a second corresponding heater for applying heat to the second secondary component located in the second recess in use, and a second ventilation channel extending from the second recess to an outside of the second clamp part, wherein the first clamp part and the second clamp part are further configured to hold the second secondary component against the fan blade when the second secondary component is received within the second recess.

* * * * *